Jan. 23, 1923. 1,443,318
A. FREUND.
VEHICLE WHEEL.
FILED JUNE 20, 1922. 2 SHEETS-SHEET 2

WITNESSES
H. J. Walker
Harrison Ott

INVENTOR
Alfred Freund
BY Munn & Co
ATTORNEYS

Patented Jan. 23, 1923.

1,443,318

UNITED STATES PATENT OFFICE.

ALFRED FREUND, OF ST. LOUIS, MISSOURI.

VEHICLE WHEEL.

Application filed June 20, 1922. Serial No. 569,605.

*To all whom it may concern:*

Be it known that I, ALFRED FREUND, a citizen of the United States, and a resident of St. Louis, in the State of Missouri, have invented a new and Improved Vehicle Wheel, of which the following is a full, clear, and exact description.

This invention has relation to vehicles and particularly refers to pneumatic resilient wheels for motor vehicles, the same being in the nature of an improvement over a prior patent granted to me on August 8, 1916, bearing United States Letters Patent No. 1,194,163.

The invention broadly contemplates a pneumatic resilient wheel in which the inflated tire structure thereof is isolated from contact with the road in order to minimize wear thereon and preclude the possibility of punctures or stone bruises.

As a further object the invention contemplates a wheel structure which functions precisely in the capacity of the ordinary wheel equipped with a pneumatic tire whereby to resiliently support the vehicle and absorb the road shocks, but in which a solid rubber tread surface or tire is presented to the road surface.

As a still further object the invention provides a resilient wheel structure which is extremely simple, and strong and durable in its structure, inexpensive to manufacture and produce and which is thoroughly reliable and highly efficient in its purpose.

With the above recited and other objects in view, the invention resides in the novel construction set forth in the following specification, particularly pointed out in the appended claims and illustrated in the accompanying drawings, it being understood that the right is reserved to embodiments other than those actually illustrated herein to the full extent indicated by the general meaning of the terms in which the claims are expressed.

In the drawings—

Figure 1:
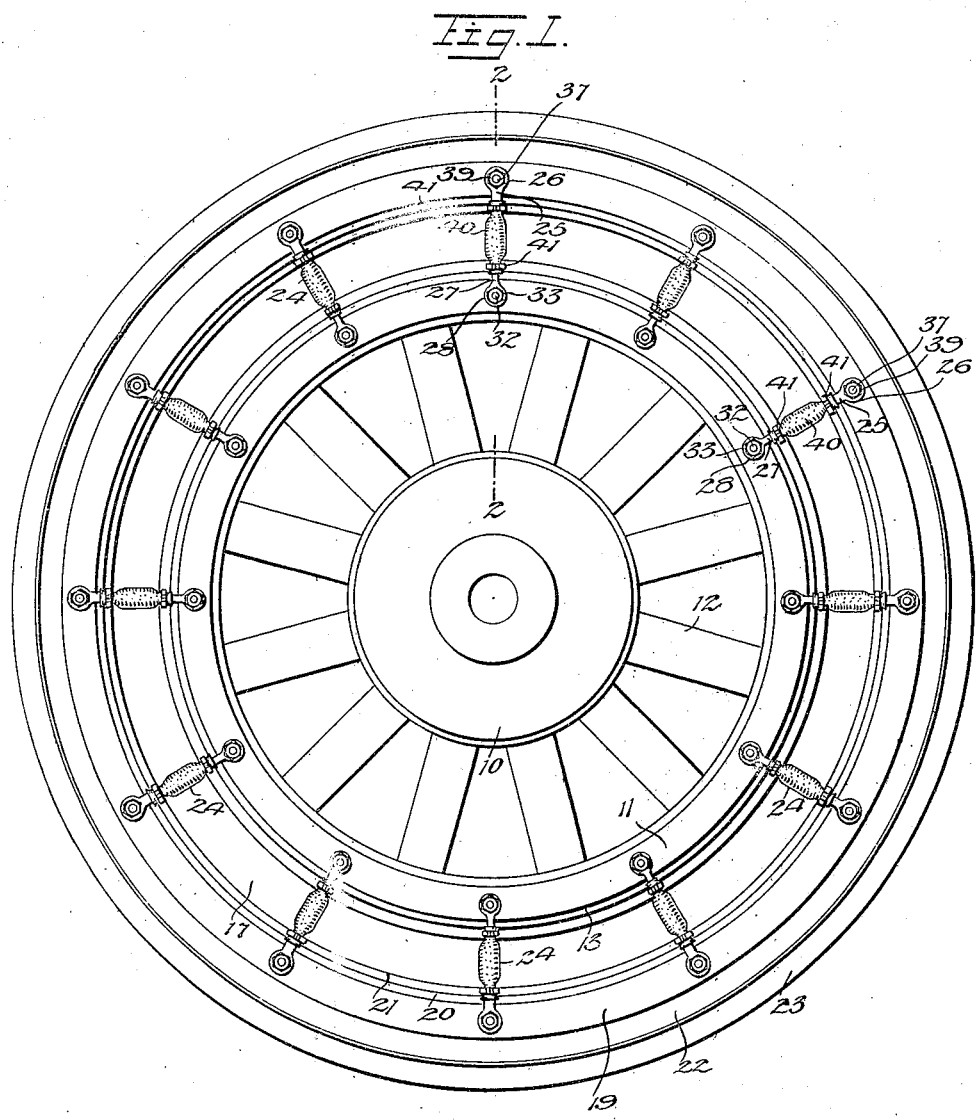
Figure 1 is a side elevation of a wheel constructed in accordance with the invention.
Figure 2:
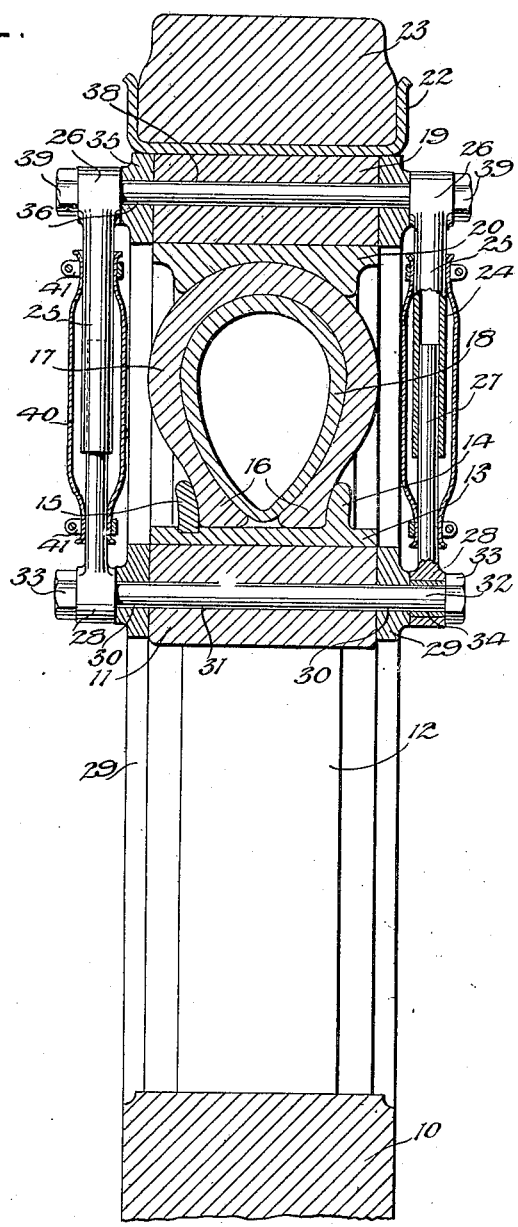
Fig. 2 is a fragmentary enlarged radial sectional view taken approximately on the line 2—2 of Fig. 1.

Referring to the drawings by characters of reference, the wheel embodies a hub 10 and an inner felly 11 which is supported from the hub preferably by radially disposed spokes 12. The outer periphery of the inner felly 11 is covered by a rim 13 which includes an integral annular bead 14 and a lock ring 15 between which the beads 16 of a tire shoe or casing 17 are adapted to be arranged after the inner inflatable tube 18 is disposed within the shoe or casing. The wheel further embodies an outer felly 19, the inner periphery of which is formed with an annular rim 20 having a central circumferential concave seat 21 which is designed to snugly receive and fit the outer central periphery of the shoe or casing 17 whereby the outer felly is normally concentrically supported from the inner felly 11. The outer periphery of the outer felly 19 is provided with a channeled rim 22 within which a solid outer tire 23 is arranged to provide a tread surface for the wheel.

In order to provide means for preventing the lateral displacement of the outer felly and at the same time compensate for the eccentric disposition of the outer felly with respect to the inner felly when the pneumatic tire is compressed the said inner and outer fellies are coupled to each other by telescopic link elements 24. The link elements consist of tubular sections 25 which are provided with eyes 28 at one end. The eyes 28 of a pair of members 27 are disposed on opposite sides of the inner felly 11 and are spaced therefrom by bearing rings 29 which are provided with apertures 30 in alignment with the eyes 28. The felly is transversely apertured as at 31 and the bolts 32 are passed through the apertures 31, the aligned eyes 28 and the apertures 30 in the rings 29. Nuts 33 are applied to the opposite ends of the bolts 32 to retain the rings 29 and members 27 in place. Preferably the eyes 28 of the members 27 are lined with bushings 34 which are of slightly greater width than the eyes 28 whereby the members 27 are attached to the inner felly 11 for free pivotal movement. A pair of members 25 are arranged at opposite sides of the outer felly 19 with their eyes 26 in alignment and are spaced therefrom by the bearing rings 35 which are apertured as at 36 to receive the transverse bearing bolt 37 which passes through a transverse aperture 38 in the outer felly 19, the apertures 36 of the bearing rings and the aligned eyes 26 of the members 25. The opposite ends of the bolts 37 have mounted thereon nuts 39 which attach the rings 35 and members 25 in place. The free ends of the tubular members 25 telescopically receive the free extremities of the solid members 27. A flexible and extensible tubular cover 40 is attached by clips 41 at its opposite ends to the members 25 and 27 respectively whereby the telescopic joint in the links 24 is protected from the possible entry of water, moisture, dust, dirt or other foreign matter, which would tend to rust or otherwise hamper the proper operation of the links.

In operation the weight of the vehicle is resiliently supported on the pneumatic tire structure, while the tread surface of the tire structure is isolated from the road to minimize the wear thereon and positively preclude the possibility of punctures of stone bruises. As the vehicle travels over the road bed, the inner felly will be disposed slightly eccentric to the outer felly under the weight of the vehicle and it will be appreciated that the connecting links 24 will compensate for the relative movements between the two fellies in view of the fact that said links are of a telescopic nature and are pivoted at their opposite extremities to the fellies.

When the tire deteriorates, the same may be replaced by removing the links 24 and the retaining ring 15. The inner tube may be inflated in the usual manner to the pressure desired, while the outer solid tire tread 23 may be replaced when worn. From the foregoing it will be seen that a highly efficient, practically puncture proof pneumatic wheel structure has been provided which functions in precisely the same manner as the usual wheel equipped with a pneumatic tire tread.

I claim:

1. A resilient wheel comprising an inner felly having a hub, an outer felly having a solid tread surface, a resilient means interposed between said fellies, a plurality of telescopic links arranged at opposite sides of the wheel and pivotally connected at their opposite extremities to the inner and outer fellies, and a flexible elastic tubular covering for said links.

2. A resilient wheel comprising a hub, an inner annular felly concentrically connected thereto, a tire shoe supporting rim around said felly, a pneumatic tire shoe or casing carried by said rim, an inner inflatable tube within said shoe or casing, an outer felly having a transversely concaved rim on its inner periphery adapted to fit over the tread portion of the shoe or casing, a solid tread carried by the outer periphery of the outer felly, and telescopic link connections between the inner and outer fellies, said connections having pivotal attachment to said fellies to permit of eccentric disposition of the fellies with respect to each other and to prevent lateral relative movement therebetween, said connections consisting of tubular members pivotally connected at one extremity to one of the fellies and the solid members pivotally connected to the other felly and telescopically received at their free extremities within the free extremities of the tubular member.

ALFRED FREUND.